(12) United States Patent
Nomura et al.

(10) Patent No.: US 10,024,221 B2
(45) Date of Patent: Jul. 17, 2018

(54) PISTON FOR PRECHAMBER-TYPE GAS ENGINE AND PRECHAMBER-TYPE GAS ENGINE

(71) Applicant: Mitsubishi Heavy Industries Engine & Turbocharger, Ltd., Kanagawa (JP)

(72) Inventors: Kazutoshi Nomura, Tokyo (JP); Kenji Hiraoka, Tokyo (JP); Akihiro Yuuki, Tokyo (JP); Satoshi Yamada, Tokyo (JP)

(73) Assignee: Mitsubishi Heavy Industries Engine & Turbocharger, Ltd., Kanagawa (JP)

( * ) Notice: Subject to any disclaimer, the term of this patent is extended or adjusted under 35 U.S.C. 154(b) by 46 days.

(21) Appl. No.: 15/024,829

(22) PCT Filed: Oct. 8, 2014

(86) PCT No.: PCT/JP2014/076981
§ 371 (c)(1),
(2) Date: Mar. 24, 2016

(87) PCT Pub. No.: WO2015/053331
PCT Pub. Date: Apr. 16, 2015

(65) Prior Publication Data
US 2016/0230647 A1    Aug. 11, 2016

(30) Foreign Application Priority Data
Oct. 9, 2013   (JP) .................................. 2013-211937

(51) Int. Cl.
*F02B 19/00*   (2006.01)
*F02B 19/18*   (2006.01)
(Continued)

(52) U.S. Cl.
CPC .............. *F02B 19/18* (2013.01); *F02B 19/00* (2013.01); *F02B 19/1019* (2013.01);
(Continued)

(58) Field of Classification Search
CPC .. F02B 19/18; F02B 19/1023; F02B 19/1019; F02B 19/12; F02B 19/16; F02B 19/00;
(Continued)

(56) References Cited

U.S. PATENT DOCUMENTS 4,721,080 A * 1/1988 Moriyasu ................ F02B 23/06
123/256
5,065,715 A * 11/1991 Evans ..................... F02B 23/08
123/263

(Continued)

FOREIGN PATENT DOCUMENTS

CN   101839166 A   9/2010
DE   102012218438 A1   4/2013
(Continued)

OTHER PUBLICATIONS

Extended European Search Report, App. No. 14851622.2, dated Apr. 25, 2017, 8 Pages.

(Continued)

*Primary Examiner* — Hieu T Vo
*Assistant Examiner* — Sherman Manley
(74) *Attorney, Agent, or Firm* — Berkeley Law & Technology Group, LLP

(57) ABSTRACT

Particular embodiments may provide a piston for a prechamber-type gas engine and a prechamber-type gas engine taking into consideration the shape of the piston top surface portion so that the region where flame propagation due to torch jet is delayed, a piston for a prechamber-type gas engine where torch jet formed by combustion a prechamber fuel in a precombustion chamber is injected to a main combustion chamber through a plurality of injection holes, may include a piston top surface portion comprising a land portion formed in a first region extending between axis line directions of adjacent injection holes, and the first region is (Continued)

positioned at a higher position than a second region extending across the axis line direction. The land portion may be formed on a cavity formed in the piston top surface portion. A plurality of land portions are provided corresponding to the plurality of injection holes, and the plurality of land portions are provided so as to be offset toward a same direction from a middle position between axis line directions of adjacent injection holes.

5 Claims, 5 Drawing Sheets

(51) Int. Cl.
| | | |
|---|---|---|
| F02B 19/16 | (2006.01) | |
| F02B 23/06 | (2006.01) | |
| F02B 23/08 | (2006.01) | |
| F02B 19/10 | (2006.01) | |
| F02B 19/12 | (2006.01) | |
| F02M 21/02 | (2006.01) | |
| F02B 23/10 | (2006.01) | |

(52) U.S. Cl.
CPC .......... *F02B 19/1023* (2013.01); *F02B 19/12* (2013.01); *F02B 19/16* (2013.01); *F02B 23/0636* (2013.01); *F02B 23/0651* (2013.01); *F02B 23/08* (2013.01); *F02M 21/02* (2013.01); *F02B 2023/103* (2013.01); *F02B 2023/108* (2013.01); *Y02T 10/125* (2013.01); *Y02T 10/32* (2013.01)

(58) Field of Classification Search
CPC .. F02B 23/08; F02B 23/0651; F02B 23/0636; F02B 23/108; F02B 2023/103; F02B 2023/108; F02M 21/02; Y02T 10/32; Y02T 10/125
See application file for complete search history.

(56) References Cited

U.S. PATENT DOCUMENTS

| | | | | |
|---|---|---|---|---|
| 5,103,784 A * | 4/1992 | Evans | ............ | F02B 23/08 |
| | | | | 123/263 |
| 5,215,052 A * | 6/1993 | Augustin | ............ | F02B 23/0651 |
| | | | | 123/276 |
| 5,706,778 A * | 1/1998 | Kapus | ............ | F02B 23/0672 |
| | | | | 123/276 |
| 6,152,101 A * | 11/2000 | Parsi | ............ | F02B 23/06 |
| | | | | 123/193.6 |
| 7,040,279 B2 * | 5/2006 | Regueiro | ............ | F02B 23/0669 |
| | | | | 123/254 |
| 7,096,848 B2 * | 8/2006 | Ono | ............ | F02B 23/0693 |
| | | | | 123/193.6 |
| 8,528,514 B1 * | 9/2013 | Erlandson | ............ | F02B 23/0627 |
| | | | | 123/193.4 |
| 2003/0051694 A1 * | 3/2003 | Gaiser | ............ | F02F 3/003 |
| | | | | 123/193.6 |
| 2006/0090726 A1 * | 5/2006 | Meffert | ............ | F02B 23/0672 |
| | | | | 123/279 |
| 2008/0196690 A1 * | 8/2008 | Hotta | ............ | F02B 17/005 |
| | | | | 123/274 |
| 2008/0308656 A1 * | 12/2008 | Cavanagh | ............ | F02M 61/1826 |
| | | | | 239/533.3 |
| 2009/0145394 A1 * | 6/2009 | Nigro | ............ | F02F 3/00 |
| | | | | 123/193.6 |
| 2009/0260592 A1 * | 10/2009 | Niwa | ............ | F02B 23/101 |
| | | | | 123/143 B |
| 2011/0239983 A1 * | 10/2011 | Straub | ............ | F02B 23/0624 |
| | | | | 123/307 |
| 2011/0253094 A1 * | 10/2011 | Rothbauer | ............ | F02B 23/0651 |
| | | | | 123/276 |
| 2011/0253095 A1 * | 10/2011 | Rothbauer | ............ | F02F 3/26 |
| | | | | 123/276 |
| 2011/0271931 A1 * | 11/2011 | Rothbauer | ............ | F02B 23/0636 |
| | | | | 123/279 |
| 2012/0186555 A1 * | 7/2012 | Mueller | ............ | F02B 3/00 |
| | | | | 123/294 |
| 2013/0000596 A1 * | 1/2013 | Diaz Escano | ............ | F02B 17/005 |
| | | | | 123/25 A |
| 2013/0019837 A1 | 1/2013 | Ishii et al. | | |
| 2013/0092123 A1 * | 4/2013 | Straub | ............ | F02B 23/0651 |
| | | | | 123/298 |

FOREIGN PATENT DOCUMENTS

| | | |
|---|---|---|
| JP | H46533 U | 1/1992 |
| JP | H4103229 U | 9/1992 |
| JP | H5086864 A | 4/1993 |
| JP | 2001263069 A | 9/2001 |
| JP | 2002122025 A | 4/2002 |
| JP | 2003278547 A | 10/2003 |
| JP | 2005315166 A | 11/2005 |
| JP | 2007146704 A | 6/2007 |
| JP | 2008286143 A | 11/2008 |
| JP | 2011169170 A | 9/2011 |
| WO | 2011080914 A1 | 7/2011 |

OTHER PUBLICATIONS

Notification of Transmittal of Translation of the International Preliminary Report on Patentability, App. No. PCT/JP2014/076981, Filed Oct. 8, 2014, dated Apr. 21, 2016, 16 Pages.
International Search Report, App. No. PCT/JP2014/076981, Filed Oct. 8, 2014, dated Jan. 13, 2015, 12 Pages.
Decision to Grant a Patent, App. No. JP2015-541618, Drafting Date Sep. 30, 2016, dated Oct. 7, 2016, 6 Pages.
Extended European Search Report, App. No. 14851622.2, dated Apr. 25, 2014, 8 Pages.

* cited by examiner

US 10,024,221 B2

PISTON FOR PRECHAMBER-TYPE GAS ENGINE AND PRECHAMBER-TYPE GAS ENGINE

TECHNICAL FIELD

The present disclosure relates to a piston for a prechamber-type gas engine and a prechamber-type gas engine for suppressing knocking, particularly to a piston for a prechamber-type gas engine and a prechamber-type gas engine obtained by taking into consideration a shape of a piston top surface portion so that a region where a flame propagation by a torch jet is delayed is reduced.

BACKGROUND

Typically, in a prechamber-type gas engine 1, among so-called gas engines, as illustrated in FIG. 6 to FIG. 8, since the main combustion chamber 4 for combusting premixed lean-burn gas is defined by a piston top surface portion at TDC (top dead center) of the piston 2 together with a lower surface of the cylinder head 3 and the cylinder liner, in order to inject a flame generated in the precombustion chamber 5 from the injection hole 6 of the precombustion chamber 5 to the main combustion chamber 4, it is necessary to allow the torch-like flame jet (torch jet, tj) from the injection hole 6 to reach a cylinder edge uniformly.

That is, in the prechamber-type gas engine 1 illustrated in FIG. 6 to FIG. 8, the precombustion chamber 5 is provided with a plurality of injection holes 6 which are in communication with a mixed gas-ignition device (not shown) such as an ignition plug or an igniting-fuel injection valve and with the main combustion chamber 4, and the injection holes 6 are arranged so that the extending directions thereof are spaced at the same angular interval θ in a planar view. For example, in the case of the number of the injection holes of n, the angular interval is represented by θ=360/n degrees, and in the case of FIG. 6, n=6 and θ=60 degrees.

Further, a fuel gas is supplied to the precombustion chamber 5 so as to form a rich mixture which is likely to be ignited upon compression by the piston 2. A lean mixture is introduced into the main combustion chamber 4 through a supply valve 7. Further, the mixture gas is combusted in the main combustion chamber 4 to form exhaust gas, which is discharged through an exhaust valve 8.

In a gas engine comprising the above structure, the rich mixture in the precombustion chamber 5 is ignited by the ignition device to be combusted, and it is injected into the main combustion chamber 4 to form a torch jet tj, and then to ignite the lean mixture. After combustion in the precombustion chamber 5, the flame in the main combustion chamber 4 proceeds along the radial direction from the torch jet tj and propagates along the circumferential direction to expand as indicated by the dashed line of FIG. 6. Then, due at least in part, to the combustion in the main combustion chamber 4, the piston 2 is moved downward from TDC to rotate the crankshaft. The piston 2 comprising reached the bottom dead center (BDC) moves upward again, where the gas is discharged through the exhaust valve 8 in the exhaust stroke. During the series of strokes as described above, a region where the flame propagation is delayed may be formed between the injection directions of the torch jets tj. Therefore, unburnt gas in this region, for example knocking region K, may cause knocking, which is a factor that prevents improvement of thermal efficiency or output of the gas engine.

Patent Document 1 (identified below) discloses a combustion chamber of a large-sized gas engine. That is, Patent Document 1 discloses a combustion chamber applied to a gas engine, which comprises a piston comprising an upper surface of which circumferential edge portion comprises a flat surface and which comprises a protruded portion formed in the middle portion of the piston. According to Patent Document 1, the volume of periphery of the main combustion chamber is larger and the fuel becomes likely to flow to the periphery, and a portion such as a valve recess or a top clearance portion, which conventional main combustion chamber usually comprise, where the density of the gas tends to be relatively lower in the lean gas, becomes unnecessary, whereby lean gas which is to be ignited in a delayed fashion does not exist in the periphery.

Patent Document 2 (identified below) discloses a prechamber-type gas engine comprising a squish portion formed between an upper edge surface of a combustion piston at TDC and a lower surface of a cylinder cover, and the piston comprises a plate-like cavity used for a prechamber-type gas engine where a flame generated in the prechamber is injected from a prechamber hole of the prechamber to the combustion chamber, wherein the ratio of the parallel length T of the upper edge surface of the piston facing to the squish portion to the inner diameter B of the cylinder of the engine is set to be 0<T/B≤0.07. According to Patent Document 2, by maintaining the ratio within the range of 0<T/B≤0.07, even if the cylinder inner diameter excesses a certain value, a part of the flame jet injected from the prechamber to the combustion chamber reaches sufficiently deep into the squish portion. According to the document, the flame propagation of the flame jet thereby pushes out unburnt mixture gas remaining in the squish portion, and the amount of the unburnt mixture gas remaining in the squish portion may be reduced.

Patent Document 1: WO2011/080914
Patent Document 2: JP 2008-286143 A

SUMMARY

With respect to the combustion chamber disclosed in Patent Document 1, even if the purpose is accomplished by forming the protruded portion in the middle portion of the piston, the processing to form the protruded portion in the middle portion of the piston is difficult, and the manufacturing cost may also be a problem. With respect to the prechamber-type gas engine disclosed in Patent Document 2, by forming the squish portion between the upper edge surface of the piston at TDC and the lower surface of the cylinder cover, the main combustion chamber is defined by the cylinder head and the upper edge surface of the piston. Thus, improvement in the compression ratio is limited, and it may lead to reduction in the compression efficiency.

In view of the above background, particular embodiments provide a piston for a prechamber-type gas engine and a prechamber-type gas engine, which may suppress knocking, which is an abnormal combustion, by providing land portion in a region in a cavity in the piston top surface portion where the diffusion of the torch jet is delayed.

DETAILED DESCRIPTION

Figure 1:
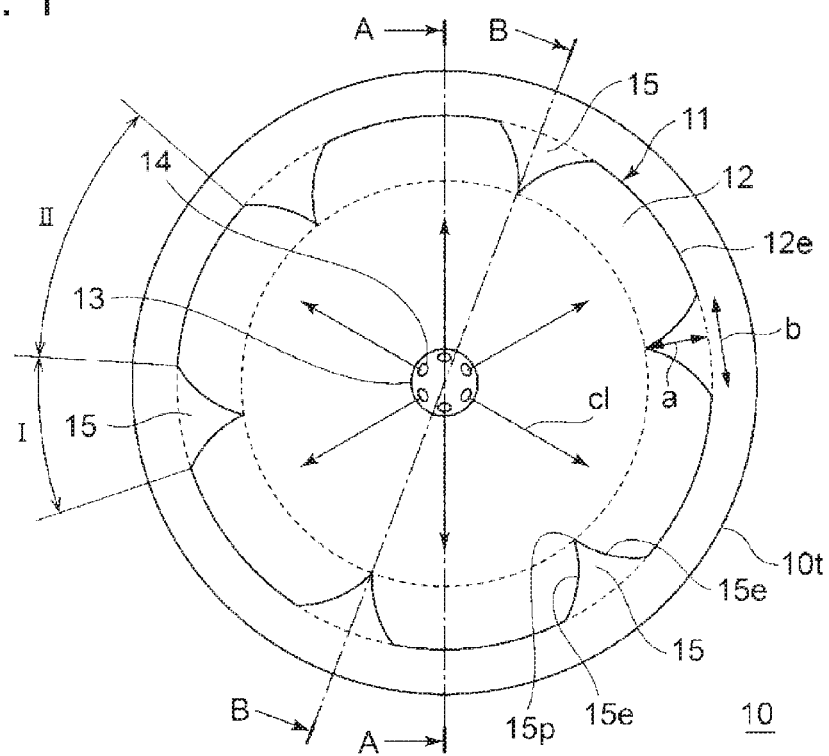
FIG. 1 is a schematic planar view of an example piston for a prechamber-type gas engine according to a first embodiment, illustrating a relation between the land portion on the cavity in the piston top surface portion and the injection direction of torch jet from the injection hole of the precombustion chamber.

In particular embodiments, a piston for prechamber-type gas engine, in which a torch jet formed by combusting a prechamber fuel in a precombustion chamber is injected to a main combustion chamber through a plurality of injection holes, comprises a piston top surface portion for defining the main combustion chamber together with a cylinder head and a cylinder liner. The piston top surface portion comprises a land portion formed in a first region extending between axis line directions of adjacent injection holes among the plurality of injection holes, the first region being positioned at a higher position than a second region extending across the axis line direction.

The torch jet injected through the injection holes of the precombustion chamber thereby diffuses from the injection holes to the first region and the second region of the main combustion chamber. Since the land portion is provided in the first region, it is possible to reduce the region where the diffusion of the torch jet is delayed, whereby it is possible to suppress knocking, which is an abnormal combustion.

According to a second aspect of particular embodiments, a land portion may be formed on a cavity formed in the piston top surface portion. A distance from a circumferential edge portion of the cavity in the first region to a central axis may be smaller than a distance from a circumferential edge portion of the cavity in the second region to the central axis.

The torch jet from the injection holes thereby diffuses in the cavity. With the above land portion, it is possible to suppress delay of the diffusion of the torch jet in the cavity.

According to a third aspect of particular embodiments, a plurality of land portions are provided corresponding to the plurality of injection holes. The plurality of land portions are provided so as to be offset toward a same direction from a middle position between axis line directions of adjacent injection holes among the plurality of injection holes.

If the torch jet injected from of the injection holes diffuses in the cavity, flame propagation due, at least in part, to the torch jets from the adjacent injection holes thereby comprises different momentums between the flame propagation reaching the land portion, which is offset toward the same direction from the middle position between the axis line directions, and the flame propagation to the region on a side away from the land portion. Thus, the flame propagation due to the torch jets injected from the plurality of injection holes proceeds in the same manner along the same direction, whereby it is possible to provide diffusion of the flame propagation where uneven distribution is suppressed as a whole.

According to a fourth aspect of particular embodiments, the land portion comprises a concave curved surface facing to the injection hole.

By providing the concave curved surface of the land portion, the torch jet injected from the injection hole proceeds smoothly along the concave curved surface while the flame propagation is less disturbed.

According to a fifth aspect of particular embodiments, the concave curved surface comprises a curvature defined based, at least in part, on an arc centered at a tip of a potential core of the torch jet and comprising a radius of Lprop which is a minimum flame propagation distance defined by the following expression:

$$L_{prop} = L \times \sin \theta t,$$

where R is a radius of the cavity, L is a length of the potential core of the torch jet, and θt is an injection angle.

In the above configuration, since the concave curved surface of the land portion is defined based, at least in part, on the radius R of the cavity, the length L of the potential core of the torch jet, and the injection angle θt, it is possible to design the land portion in accordance with the specifications or dimensions of the engine which is to be actually used, whereby it is possible to reduce the region where the flame propagation tends to be delayed and to suppress knocking due to delay in the flame propagation.

Further, according to a sixth aspect of particular embodiments, a prechamber-type gas engine comprising the piston for a prechamber-type gas engine according to at least one of the first to fifth aspect of particular embodiments. With this aspect, based at least in part on the shape of the top surface portion of the piston, it is possible to provide a prechamber-type gas engine where the flame propagation is more smooth.

According to at least an aspect of particular embodiments, by providing the land portion, it is possible to reduce the region where the flame propagation tends to be delayed, and thereby to suppress knocking, which is an abnormal combustion. In some embodiments in which the land portion is set based at least in part on the minimum flame propagation distance defined by using the radius of the cavity, the length of the potential core of the torch jet and the injection angle, the flame propagation becomes more efficient, whereby it is possible to improve the combustion efficiency.

Particular embodiments will now be described in detail with reference to the accompanying drawings. It is intended, however, that unless particularly specified, dimensions, materials, shapes, relative positions and the like of components described in the embodiments shall be interpreted as illustrative only and not limitative of the scope of claimed subject matter.

First Embodiment

FIG. 1 is a schematic diagram illustrating the piston top surface portion according to first embodiment. A prechamber-type gas engine comprises an engine of a type where a torch jet formed by combusting a prechamber fuel in a precombustion chamber is injected to a main combustion chamber through a plurality of injection holes, and comprises an engine for lean premixed combustion with a large bore. In such a prechamber-type gas engine, a piston 10 comprises a piston top surface portion 10t defining a main combustion chamber 11 together with a cylinder head (not shown) and a cylinder liner (not shown).

Figure 2A:
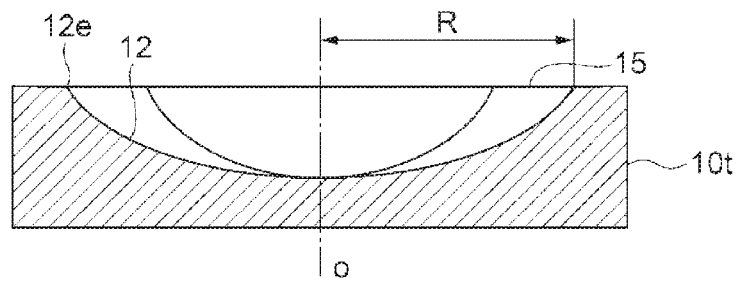
FIG. 2a is an A-A cross-sectional view of an example piston top surface portion illustrated in FIG. 1, viewed from the direction indicated by the arrow, according to an embodiment.
Figure 2B:
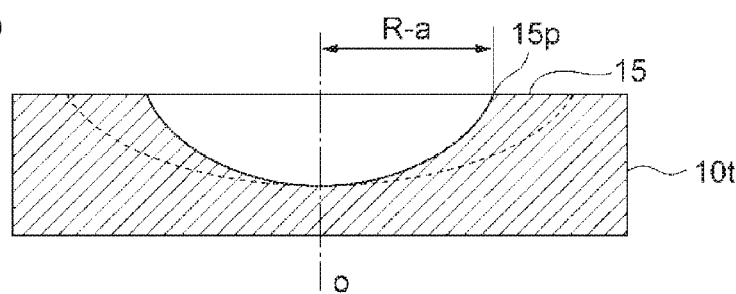
FIG. 2b is a B-B cross-sectional view of an example piston top surface portion illustrated in FIG. 1, viewed from the direction indicated by the arrow, according to an embodiment.

The piston top surface portion 10t comprises a cavity 12 comprising a radius R, which is formed concentrically with, or at least substantially concentric with, the piston 10 comprising a center O. The cavity 12 comprises a relatively large depth at the position of the center O of the piston 10, and comprises a concave curved surface formed from a circumferential edge portion 12e of the cavity toward the center O, in a cross-sectional view (see FIG. 2a and FIG. 2b).

A precombustion chamber 13 mounted on the cylinder head (not shown) and facing to the piston top surface portion 10t is positioned above the cavity 12 of the piston. On the outer circumferential surface of the precombustion chamber 13, a plurality of injection holes 14 are provided, spaced at approximately the same angular interval in the circumferential direction of the injection holes. In particular embodiments illustrated in the drawing, the precombustion chamber 13 is positioned just above the center O of the piston 10, and six injection holes 14 are provided, spaced at approximately the same angular interval of 60 degrees. On the cavity, a land portion 15 is formed in a first region I extending between axis line directions of adjacent injection holes 14 among the plurality of injection holes 14, where the first region I is positioned at a higher position than a second region II extending across the axis line direction of the injection hole 14. The land portion 15 in the embodiment illustrated in the drawing is formed so as to be approximately flush with the outer circumferential portion of the piston top surface portion 10t where cavity 12 is not formed. That is, in the land portion 15, the circumferential edge portion 12e of the cavity 12 is formed at a position closer to the center O than a circle comprising a radius R and centered at the center O.

The axis line direction of the injection hole 14, indicated by arrow cl of a thick solid line, is the direction of the central axis of injection of the torch jet tj formed by combusting prechamber fuel in the precombustion chamber 13. The first region I is a region where the distance D from the center O of the piston 10 to the circumferential edge portion 12e satisfies the following relational expression: R−a≤D<R, in the region extends between intersections of the circumferential edge portion 12e of the cavity and the directions of the central axes of injection of the torch jets tf from adjacent two injection holes 14, i.e. the injection central axis lines cl. The second region II is a region of a position where the distance D from the center O of the piston 10 to the circumferential edge portion 12e satisfies the following relational expression: D=R (where R is the radius of the cavity 12), among intersections of the circumferential edge portion 12e of the cavity 12 and the injection central axis line cl of the torch jet tj from the injection hole 14.

Now, the land portion 15 will be described. The land portion 15 comprises a ridge line portion 15e comprising a tip portion 15p at which the distance D from the center O of the piston 10 is R-a, or, which is at the closest position, in the circumferential edge portion 12e, to the center O. The ridge line portion 15e, in the shape of a concave curve toward the clockwise and counter clockwise, extends from the tip portion 15p toward the circumferential edge portion 12e on which the intersection of the circumferential edge portion 12e of the cavity 12 and the injection center axis line cl of the torch jet tj is present. That is, the land portion 15 is formed as a protruding edge portion comprising a substantially triangular shape which protrudes toward the center O, as illustrated in the drawing. Further, the bottom portion of the cavity 12—comprises a concave curved surface such that a part of the bottom portion of the cavity 12 on an axis line through the center O of the piston 10 and the tip portion 15p of the land portion 15 comprises a larger curvature than another part of the bottom portion of the cavity 12 on an axis line through the center of the piston 10 and not through the tip portion 15p.

As described above, the land portion 15 comprises a tip portion 15p at which the distance D from the center O of the piston 10 is R-a, and a ridge line portion 15e extending toward the circumferential edge portion 12e of the cavity 12 and comprising a concave curve shape in the clockwise and counterclockwise directions. Further, the bottom portion of the cavity 12 comprises a concave curved surface such that a part of the bottom portion of the cavity 12 on an axis line through the center O of the piston 10 and the tip portion 15p of the land portion 15 comprises a larger curvature than another part of the bottom portion of the cavity 12 on an axis line through the center of the piston 10 and not through the tip portion 15p. Thus, in the land portion 15, the surface which faces to the injection hole 14 comprises a concave curved surface.

A plurality of land portions 15 as described above are provided corresponding to the plurality of injection holes 14. That is, the number of the land portions 15 is the same as the number of the injection holes 14. Further, the land portions 15 are provided so as to be offset toward a same direction, i.e. in the circumferential direction, in the clockwise or counterclockwise direction, from a middle position between axis line directions of adjacent injection holes 14, i.e. within the region between the intersections of the circumferential edge portion 12d of the cavity 12 and the injection center axis lines cl of the torch jets tj from adjacent injection holes 14. In particular embodiments, such as the embodiment illustrated in the drawing, six land portions 15 corresponding to six injection holes 14 are provided, spaced at the same angular interval of approximately 60 degrees in the circumferential direction.

The action of the piston 10 for a prechamber-type gas engine according to the first embodiment as described above, will now be described. Firstly, a sequence of actions of a prechamber-type gas engine will be described.

A prechamber-type gas engine is operated along the following procedure, for example. In the vicinity of the intake stroke, a prechamber fuel is supplied to the precombustion chamber 13 from a prechamber gas supply line (not shown). In the compression stroke, lean premixed gas in the main combustion chamber 11 flows into the precombustion chamber 13 through the injection holes 14 of the precombustion chamber 13 and is mixed in the precombustion chamber, and a nearly stoichiometric mixture gas is formed in the precombustion chamber 13 before ignition. Spark ignition may be carried out in the precombustion chamber 13 by using a spark plug to bring about flame propagation combustion in the precombustion chamber 13. In response the combustion gas blows out from the injection holes 14 of the precombustion chamber 13 to form torch jets tj in the main combustion chamber 11 (see FIG. 1).

In an embodiment, the torch jet injected through the injection holes 14 of the precombustion chamber 13 diffuses from the injection holes 14 to the first region I and the second region II in the cavity 12 as the main combustion chamber 11. In this manner, the torch jet tj injected from the injection holes 14 diffuses in the cavity 12. In this regard, within the region between the intersections of the injection center axis lines cl of the torch jets tj from adjacent injection holes 14, flame propagation due to the torch jets tj from the adjacent injection holes 14 includes flame propagation which reaches the land portions 15 which are offset toward the same direction in the circumferential direction, i.e. the clockwise or counterclockwise direction, of the circumferential edge portion 12e, from the middle portion between the intersections of the injection center axis lines cl and the circumferential edge portion 12e of the cavity 12, and flame propagation which proceeds to a region on the side away from the land portion 15.

Then, the flame propagation reaching the land portion 15 and the flame propagation to the region on the side away from the land portion 15 may comprise different momentums. That is, the land portion 15 is formed in a position where the flame propagation is delayed, and by forming the land portion 15, the area where the flame propagation is delayed is reduced in the cavity 12. Thus, the flame propagation due to the torch jets tj injected from the plurality of injection holes 14 proceeds in the same manner in the shape of a diffusion flux along the same direction, and the diffusion of the flame propagation proceeds with a suppressed uneven distribution as a whole.

As described above, the land portion 15 comprises a ridge line portion 15e which extends from the tip portion 15p toward the circumferential edge portion 12e in which the intersections of the injection central axis lines cl of the torch jets tj and the circumferential edge portion 12e are present and which comprises a concave curve-like shape in the clockwise and counterclockwise directions. Further, the bottom portion of the cavity 12 comprises a concave curved surface such that a part of the bottom portion of the cavity 12 on an axis line through the center O of the piston 10 and the tip portion 15p of the land portion 15 comprises a larger curvature than another part of the bottom portion of the cavity 12 on an axis line through the center of the piston 10 and not through the tip portion 15p. Thus, the torch jets tj diffuse while the diffusion is less disturbed, and it is possible to reduce the region where the flame propagation is delayed, whereby it is possible to suppress knocking, which is an abnormal combustion.

The second embodiment will now be described.

Figure 3:
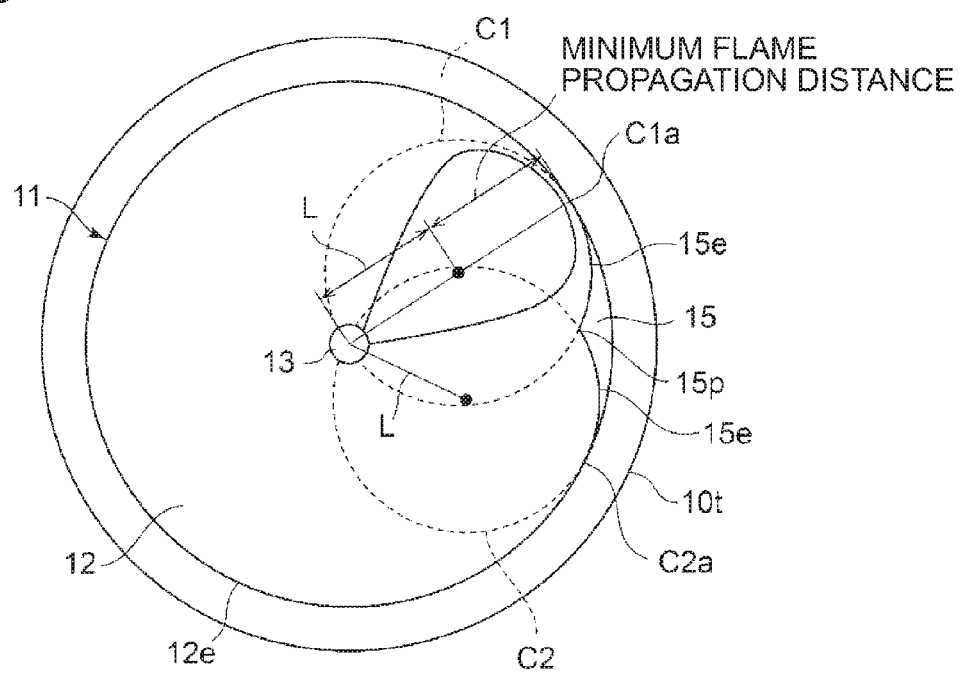
FIG. 3 is a schematic planar view of an example piston for a prechamber-type gas engine, according to a second embodiment, illustrating the land portion, in the piston top surface portion, set based at least in part on the minimum flame propagation distance defined by the radius of the cavity, the length of the potential core of the torch jet and the injection angle.
Figure 4:
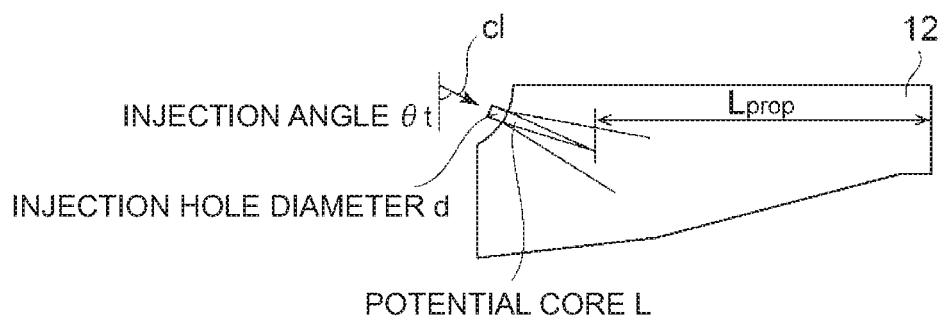
FIG. 4 is a diagram illustrating an example relation between a torch jet from the injection hole of the precombustion chamber and the flame propagation distance, in the main combustion chamber, according to an embodiment.
Figure 5:
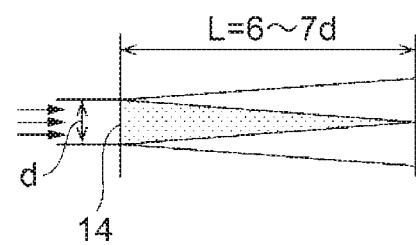
FIG. 5 is a diagram illustrating an example relation between the diameter of the injection hole and the potential core of the torch jet, shown in FIG. 3, according to an embodiment.
Figure 6:
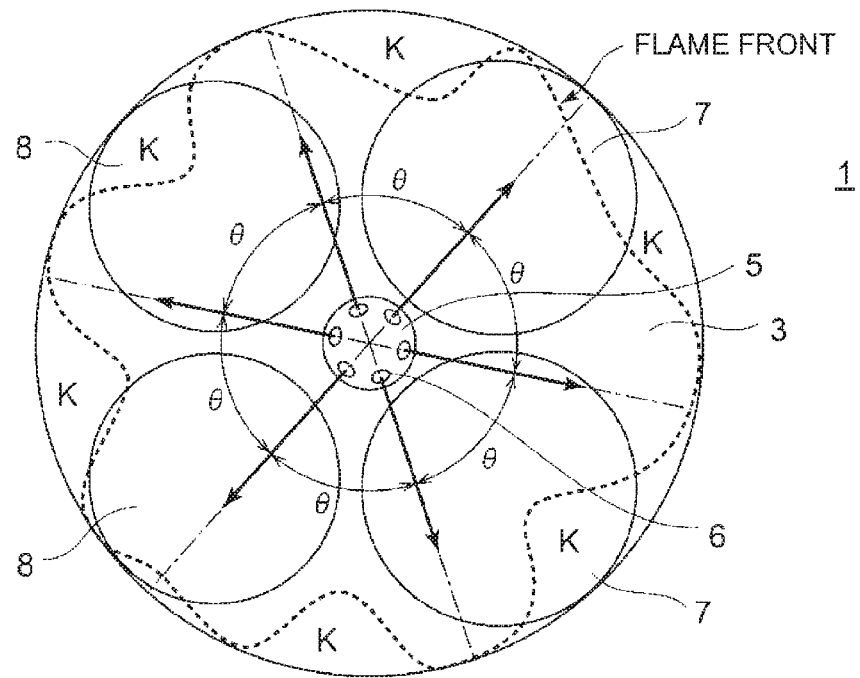
FIG. 6 is a schematic planar view of an example piston top surface portion, illustrating the injection direction of a torch jet from the injection hole of the precombustion chamber, the flame propagation direction and the knocking region, in the main combustion chamber.
Figure 7:
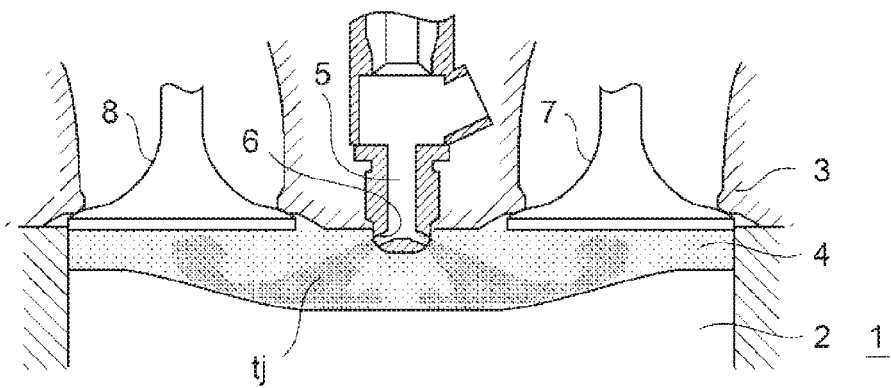
FIG. 7 is an enlarged cross-sectional view of an example major part, illustrating a state wherein a torch jet is injected from the injection hole of the precombustion chamber above the cylinder head to the main combustion chamber in the piston top surface portion.
Figure 8:
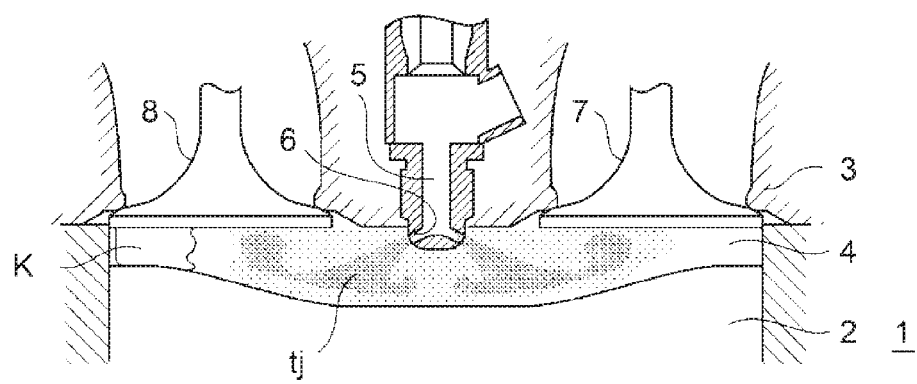
FIG. 8 is an enlarged cross-sectional view of an example major part, illustrating knocking phenomena caused in the main combustion chamber shown in FIG. 7.

In a second embodiment, as illustrated in FIG. 3, the curvature of the concave curved surface formed by the ridge line portion 15e which extends from the tip portion 15p of the land portion 15 toward the circumferential edge portion 12e of the cavity 12 and which comprises a concave curve-like shape in the clockwise and counterclockwise directions, may be computed from the following expression (1). Here, it is assumed that the torch jet tj is a jet flow comprising a potential core length L of 6 to 7 times as large as the diameter d of the injection hole 14 of the precombustion chamber 13. It is also assumed that the flame propagates along the distance from the tip of the jet flow to the wall surface (see FIG. 4). The minimum flame propagation distance Lprop is represented by the following expression:

$$L\text{prop}=L\times\sin\theta t \quad (1)$$

where $\theta t$ is the injection angle which is the angle between the injection central axis line cl and the perpendicular direction, in a cross-sectional view.

That is, the curvature of the concave curved surface formed by the ridge line portion 15e extending in a shape of a concave curved line in the both sides of the land portion 15 may be defined based, at least in part, on the arc which is centered at the tip of the potential core of the torch jet tj and which comprises a radius of the minimum flame propagation distance Lprop represented by the following expression:

$$L\text{prop}=L\times\sin\theta t,$$

where R is the radius of the cavity 12, L is the length of the potential core, and $\theta t$ is the injection angle. In the embodiment illustrated in FIG. 3, the intersection of the two circles C1 and C2 centered at the tip of the torch jets tj from adjacent injection holes 14, respectively, and comprising a radius of Lprop forms the tip portion 15p, and the arcs between the tip portion 15p and the tangent points C1a and C2a between the circumferential edge portion 12e and the circles C1 and C2 with the radius of Lprop, respectively, form the ridge line portion 15e.

In this manner, the concave curved surface of the land portion is defined based, at least in part, on the minimum flame propagation distance Lprop obtained from the radius R of the cavity 12, the potential core length L of the torch jet tj and the injection angle $\theta t$. Thus, the land portion 15 may be designed in accordance with specifications, torch jet or dimensions of the prechamber-type gas engine which is to be actually used. Therefore, it is possible to reduce the region where the flam propagation tends to be delayed thereby to suppress knocking due to delay in the flame propagation, as much as possible.

With the piston for a prechamber-type gas engine according to some embodiments, the land portion can be designed in accordance with specifications or dimensions of a gas engine for actual use, and knocking due to delay in the flame propagation can be suppressed as much as possible. Thus, the piston according to some embodiments has broad utility and is widely applicable to prechamber-type gas engines of various specifications or standards.

The invention claimed is:

1. A prechamber-type gas engine utilizing a torch jet formed by combusting a prechamber fuel in a precombustion chamber to be injected into a main combustion chamber through a plurality of injection holes, comprising:
    the precombustion chamber on which the plurality of injection holes are provided, and
    a piston which includes a piston top surface portion to define the main combustion chamber together with a cylinder head and a cylinder liner,
    wherein the piston top surface portion comprises a cavity formed substantially concentric with the piston, the cavity comprising a bottom portion such that the cavity comprises a concave curved surface and comprises a depth which increases as a radial position becomes closer to the center position of the piston from a circumferential edge portion and wherein the depth is largest at the center position of the piston,
    wherein the piston top surface portion comprises a land portion formed in a first region extending between axis line directions of adjacent injection holes among the plurality of injection holes, the first region being positioned at a higher position than a second region extending across the axis line direction, and wherein the bottom portion of the cavity comprises the concave curved surface such that a part of the bottom portion of the cavity on an axis line through the center of the piston and a tip portion of the land portion comprises a larger curvature than another part of the bottom portion of the cavity on an axis line through the center of the piston and not through the tip portion.

2. The piston for a prechamber-type gas engine according to claim 1, wherein the land portion is formed on the cavity, and wherein a distance from a circumferential edge portion of the cavity in the first region to a central axis is smaller than a distance from a circumferential edge portion of the cavity in the second region to the central axis.

3. The prechamber-type gas engine according to claim 1, wherein a plurality of land portions are provided corresponding to the plurality of injection holes, and wherein the plurality of land portions are provided so as to be offset toward a same direction from a middle position between axis line directions of adjacent injection holes among the plurality of injection holes.

4. The prechamber-type gas engine according to claim 1, wherein the land portion comprises a concave curved surface facing the injection hole.

5. The prechamber-type gas engine according to claim 4, wherein the concave curved surface comprises a curvature defined based, at least in part, on an arc centered at a tip of a potential core of the torch jet and comprising a radius of Lprop which is a minimum flame propagation distance defined by the expression:

$$L\text{prop} = R - L \times \sin \theta t$$

where R is a radius of the cavity, L is a length of the potential core of the torch jet, and θt is an injection angle.

* * * * *